(12) United States Patent
Mostapha et al.

(10) Patent No.: US 12,507,959 B2
(45) Date of Patent: Dec. 30, 2025

(54) GLOBAL TRACTOGRAPHY BASED ON MACHINE LEARNING

(71) Applicant: Siemens Healthineers AG, Erlangen (DE)

(72) Inventors: Mahmoud Mostapha, Princeton, NJ (US); Boris Mailhe, Plainsboro, NJ (US); Dorin Comaniciu, Princeton, NJ (US); Nirmal Janardhanan, Monmouth Junction, NJ (US); Simon Arberet, Princeton, NJ (US); Hongki Lim, Highland Park, NJ (US); Mariappan S. Nadar, Plainsboro, NJ (US)

(73) Assignee: Siemens Healthineers AG, Forchheim (DE)

( * ) Notice: Subject to any disclaimer, the term of this patent is extended or adjusted under 35 U.S.C. 154(b) by 390 days.

(21) Appl. No.: 17/930,467

(22) Filed: Sep. 8, 2022

(65) Prior Publication Data

US 2023/0093752 A1  Mar. 23, 2023

(30) Foreign Application Priority Data

Sep. 21, 2021  (EP) .................................. 21197983

(51) Int. Cl.
*A61B 5/00* (2006.01)
*A61B 5/055* (2006.01)
*G01R 33/563* (2006.01)

(52) U.S. Cl.
CPC .......... *A61B 5/7267* (2013.01); *A61B 5/0042* (2013.01); *A61B 5/055* (2013.01); *G01R 33/56341* (2013.01); *A61B 2576/026* (2013.01)

(58) Field of Classification Search
CPC . G01R 33/56341; A61B 5/055; A61B 5/0042; A61B 5/7267; G06T 7/0012
See application file for complete search history.

(56) References Cited

PUBLICATIONS

Li et al. SuperDTI: Ultrafast DTI and fiber tractography with deep learning. Magn Reson Med. 2021;86:3334ä 3347. https://doi.org/10.1002/mrm.28937. (Year: 2021).*
Theberge et al. Track-to-Learn: A general framework for tractography with deep reinforcement learning, Medical Image Analysis, vol. 72, 2021, 102093, ISSN 1361-8415, https://doi.org/10.1016/j.media.2021.102093. (Year: 2021).*
Wegmayr, V., Buhmann, J.M. Entrack: Probabilistic Spherical Regression with Entropy Regularization for Fiber Tractography. Int J Comput Vis 129, 656â680 (2021). https://doi.org/10.1007/s11263-020-01384-1. (Year: 2020).*
Zhang et al. Deep white matter analysis (DeepWMA): Fast and consistent tractography segmentation, Medical Image Analysis, vol. 65, 2020, 101761, ISSN 1361-8415, https://doi.org/10.1016/j.media.2020.101761. (Year: 2020).*

(Continued)

*Primary Examiner* — Anh T Nguyen
*Assistant Examiner* — Younhee Choi

(57) ABSTRACT

One or more tractograms of a global tractography of a tissue of interest are determined. At least one instance of diffusion magnetic resonance imaging data of the tissue of interest is obtained. A trained machine-learning algorithm generates the one or more tractograms based on the at least one instance of the diffusion magnetic resonance imaging data.

16 Claims, 10 Drawing Sheets

(56) References Cited

PUBLICATIONS

Poulin et al. Tractography and machine learning: Current state and open challenges, Magnetic Resonance Imaging, vol. 64, 2019, pp. 37-48, ISSN 0730-725X, doi: 10.1016/j.mri.2019.04.013. (Year: 2019).*

Konopleva, Lidia, et al. "Modelfree global tractography." NeuroImage 174 (2018): 576-586.

Zaheer, Manzil, et al. "Deep sets." arXiv preprint arXiv:1703.06114 (2017).

Cho, Kyunghyun, et al. "On the properties of neural machine translation: Encoder-decoder approaches." arXiv preprint arXiv:1409.1259 (2014).

Qi, Charles R., et al. "Pointnet++: Deep hierarchical feature learning on point sets in a metric space." arXiv preprint arXiv:1706.02413 (2017).

Simonyan, Karen, and Andrew Zisserman. "Very deep convolutional networks for large-scale image recognition." arXiv preprint arXiv:1409.1556 (2014).

Koch, Gregory, Richard Zemel, and Ruslan Salakhutdinov. "Siamese neural networks for one-shot image recognition." ICML deep learning workshop. vol. 2. 2015.

Kiselev, Valerij G., Gregor Korzdorfer, and Peter Gall. "Toward Quantification: Microstructure and Magnetic Resonance 30 Fingerprinting." Investigative Radiology 56.1 (2021): 1-9.

Griswold MA, Jakob PM, Heidemann RM, Nittka M, Jellus V, Wang J, Kiefer B, Haase A. Generalized autocalibrating partially parallel acquisitions (GRAPPA). Magn Reson Med 2002; 47: 1202-1210.

Pruessmann, Klaas P., et al. "SENSE: sensitivity encoding for fast MRI." Magnetic resonance in medicine 42.5 (1999): 952-962.

Breuer, Felix A., et al. "Controlled aliasing in volumetric parallel imaging (2D Caipirinha)." Magnetic Resonance in Medicine: An Official Journal of the International Society for Magnetic Resonance in Medicine 55.3 (2006): 549-556.

Gao, Jing, et al. "A survey on deep learning for multimodal data fusion." Neural Computation 32.5 (2020): 829-864.

Neher, Peter F., et al. "Fiber tractography using machine learning." Neuroimage 158 (2017): 417-429.

Poulin, Philippe, et al. "Learn to track: deep learning for tractography." International Conference on Medical Image Computing and Computer-Assisted Intervention. Springer, Cham, 2017.

Jeurissen, Ben et al: "Diffusion MRI fiber tractography of the brain"; NMR in Biomedicine; vol. 32, No. 4, Sep. 25, 2017 (Sep. 25, 2017), pp. 1-22.

Wegmayr, Viktor, and Joachim M. Buhmann. "Entrack: Probabilistic spherical regression with entropy regularization for fiber tractography." International Journal of Computer Vision 129.3 (2021): 656-680.

European Search report dated Mar. 11, 2022 in EP application No. 21197983.6, 14 pages.

Wu, Xi, et al. "DT-MRI White Matter Fiber Tractography with Global Constraints: An Unsupervised Learning Approach." 2009 3rd International Conference on Bioinformatics and Biomedical Engineering. IEEE, 2009.

Dmitri Shastin et al.: "Surface-based Short Association Fibre Tractography", Proceedings of the International Society for Magnetic Resonance in Medicine, 29th Annual Meeting and Exhibition, May 15-20, 2021, vol. 29, 4297, Apr. 30, 2021 (Apr. 30, 2021), XP040726314.

* cited by examiner

GLOBAL TRACTOGRAPHY BASED ON MACHINE LEARNING

RELATED APPLICATION

This application claims the benefit of EP 21197983, filed Sep. 21, 2021, which is hereby incorporated by reference in its entirety.

TECHNICAL FIELD

Various examples of this disclosure generally relate to diffusion-weighted (DW) magnetic resonance imaging (MRI). Various examples specifically relate to generating one or more tractograms of a global tractography using a machine learning algorithm.

BACKGROUND

Diffusion-weighted magnetic resonance imaging (DW-MRI), also called diffusion-weighted imaging (DWI), or diffusion MRI (dMRI), is a magnetic resonance imaging technique in which the contrast is indicative of the microscopic mobility of water molecules. In vivo, tissue structures such as cell membranes impede the diffusive motion of water molecules, meaning tissue with dense cellularity can be distinguishable from tissue with less densely packed cells, or pure fluid. The motion sensitization in dMRI has an orientational dependence, such that the orientation of structures such as the white matter fasciculi can be inferred. Detailed analysis of the dMRI signal/data can also allow for inference of information such as intra-axonal volume and axon diameter in neuronal tissue. By measuring the dMRI signal for each imaging voxel along a number of non-collinear orientations, the local fiber orientations can be assessed throughout the tissue of interest. These local fiber orientations can then be pieced together to infer long-range pathways connecting distant regions of the brain, a process that is most often called fiber tracking, fiber tractography, or simply tractography.

In clinical practice or research, the dMRI data may be processed using various tractography algorithms to obtain a 2D/3D representation of fiber architecture, for example in the white matter of a brain. The 2D/3D representation are called tractograms. DMRI combined with tractography has become an attractive non-invasive tool for studying the microstructure and connectivity of brain white matter in vivo, such as preoperative diagnostics and surgical targeting.

Tractography algorithms can be model-based or model-free, local or global, deterministic or probabilistic, and a combination thereof.

Model-based tractography algorithms are based on specific, pre-defined, mathematical models (e.g., diffusion tensor model) and mapping dMRI signals into fiber orientation estimates. Such modeling assumptions impose requirements on the data quality and acquisition protocol; and hence no longer holds, particularly with recent advancements in ultra-high gradients (e.g., 7 tesla (T)) and accelerated diffusion sequences.

FIG. 1 schematically illustrates a model-based local tractography approach according to prior-art techniques. From the raw dMRI data, the local fiber orientations are extracted using a fiber orientation distribution function (fODF) as a propagator, and then tracking is performed in successive integration steps by following the local fiber orientations that have previously been extracted independently from each other using an appropriate model. An individual integration step is not affected by the previous steps or by other tracks passing the same region. The local tractography is, for example, voxel-based. I.e., there is no feedback from the reconstructed tracks to the local fiber orientation field or the raw dMRI data.

Local tractography techniques are quick and used widely, however, they have several critical drawbacks, including sensitivity to errors (mainly due to measurement noise) in the estimated local fiber orientations, which can accumulate and significantly affect the result. Moreover, the generated tractograms have a poor predictor of the dMRI data, resulting in fiber tracts with little to no quantitative or biological meaning.

Global tractography methods, on the other hand, try to reconstruct all tracks simultaneously by finding the configuration that best describes the measured dMRI data. FIG. 2 schematically illustrates a global tractography approach according to the prior art. The global approach or optimization algorithm is searching for the set of tracks that optimally explains the dMRI data (minimal residual), typically by perturbing and linking a dense set of local track segments. In general, the global approach selects suitable prior knowledge about the expected properties of the trajectories such as local smoothness.

Global tractography algorithms can oftentimes produce more robust estimations to noise and imaging artifacts and a better agreement with the acquired dMRI data, if compared to local tractography algorithms. However, such strategies rely on computationally heavy stochastic optimization procedures and pre-defined prior knowledge about the trajectories' expected properties, which limits their usage in practice. Specification of prior knowledge that is too strong might lead to inconsistencies with the actual dMRI data, potentially resulting in non-existent fiber trajectories. On the other hand, specification of prior knowledge that is too weak might lead to fiber tracks that perfectly match the underlying dMRI data, but that make little sense anatomically.

For example, non-patent literature Konopleva, Lidia, et al. "Modelfree global tractography." *NeuroImage* 174 (2018): 576-586 discloses a global tractography approach based on a traditional Reversible Jump Monte Carlo Markov Chain (RJMCMC) optimization procedure, where a diffusion model-free data term was introduced.

However, such an approach still relies on engineered prior knowledge to be considered a proper model-free solution. These assumptions include interpreting dMRI as a convolution of a sparse fiber orientation distribution with an axially symmetric, spatially variable fiber response function. Moreover, their overall energy formulation relies on rigid engineered terms that favor specific trajectories (e.g., long fiber trajectories with low curvature and a limited number of segments). Moreover, the described RJMCMC stochastic optimization procedure is slow to converge and does not guarantee convergence to a globally optimal solution.

SUMMARY

Therefore, a need exists for advanced techniques of generating tractograms and/or tractography. More specifically, a need exists for advanced techniques of reliably and precisely generating model-free global tractography.

A method for determining one or more tractograms of a global tractography of a tissue of interest is disclosed. The method includes obtaining at least one instance of diffusion magnetic resonance imaging data of the tissue of interest. The method further includes generating, by a trained machine-learning algorithm, the one or more tractograms based on the at least one instance of the diffusion magnetic resonance imaging data.

A method of performing a training of a machine-learning algorithm for determining one or more tractograms of a global tractography of a tissue of interest is disclosed. The method includes obtaining at least one instance of training diffusion-weighted imaging data of the tissue of interest. The method further includes generating, by the machine-learning algorithm, a prediction of the one or more tractograms based on the at least one instance of the training diffusion-weighted imaging data and updating parameter values of the machine-learning algorithm based on a comparison between the prediction and corresponding reference tractograms of the at least one instance of the training diffusion-weighted imaging data.

A system includes at least one processor and at least one memory. The at least one processor is configured to load program code from the at least one memory and execute the program code to determine one or more tractograms of a global tractography of a tissue of interest. The determination includes acquisition of at least one instance of diffusion magnetic resonance imaging data of the tissue of interest. The determination further includes generation, by a trained machine-learning algorithm, of the one or more tractograms based on the at least one instance of the diffusion magnetic resonance imaging data.

A system includes at least one processor and at least one memory. The at least one processor is configured to load program code from the at least one memory and execute the program code to perform training of a machine-learning algorithm for determining one or more tractograms of a global tractography of a tissue of interest. The training includes acquisition of at least one instance of training diffusion-weighted imaging data of the tissue of interest. The training further includes generation, by the machine-learning algorithm, of a prediction of the one or more tractograms based on the at least one instance of the training diffusion-weighted imaging data and update of parameter values of the machine-learning algorithm based on a comparison between the prediction and corresponding reference tractograms of the at least one instance of the training diffusion-weighted imaging data.

A magnetic resonance imaging scanner includes at least one processor and at least one memory. The at least one processor is configured to load program code from the at least one memory and execute the program code to determine one or more tractograms of a global tractography of a tissue of interest. The determination includes acquisition of at least one instance of diffusion magnetic resonance imaging data of the tissue of interest. The determination further includes generation, by a trained machine-learning algorithm, of the one or more tractograms based on the at least one instance of the diffusion magnetic resonance imaging data.

A magnetic resonance imaging scanner includes at least one processor and at least one memory. The at least one processor is configured to load program code from the at least one memory and execute the program code to perform training of a machine-learning algorithm for determining one or more tractograms of a global tractography of a tissue of interest. The training includes acquisition of at least one instance of training diffusion-weighted imaging data of the tissue of interest. The training further includes generation, by the machine-learning algorithm, of a prediction of the one or more tractograms based on the at least one instance of the training diffusion-weighted imaging data and update of parameter values of the machine-learning algorithm based on a comparison between the prediction and corresponding reference tractograms of the at least one instance of the training diffusion-weighted imaging data.

A computer program product or a computer program or a computer-readable storage medium includes program code. The program code can be executed by at least one processor. Executing the program code causes the at least one processor to determine one or more tractograms of a global tractography of a tissue of interest. The determination includes acquisition of at least one instance of diffusion magnetic resonance imaging data of the tissue of interest. The determination further includes generation, by a trained machine-learning algorithm, of the one or more tractograms based on the at least one instance of the diffusion magnetic resonance imaging data.

A computer program product or a computer program or a computer-readable storage medium includes program code. The program code can be executed by at least one processor. Executing the program code causes the at least one processor to train a machine-learning algorithm for determining one or more tractograms of a global tractography of a tissue of interest. The training includes acquisition of at least one instance of training diffusion-weighted imaging data of the tissue of interest. The training further includes generation, by the machine-learning algorithm, of a prediction of the one or more tractograms based on the at least one instance of the training diffusion-weighted imaging data and update of parameter values of the machine-learning algorithm based on a comparison between the prediction and corresponding reference tractograms of the at least one instance of the training diffusion-weighted imaging data.

It is to be understood that the features mentioned above and those yet to be explained below may be used not only in the respective combinations indicated, but also in other combinations or in isolation without departing from the scope of the invention.

DETAILED DESCRIPTION OF THE DRAWINGS

Figure 1:
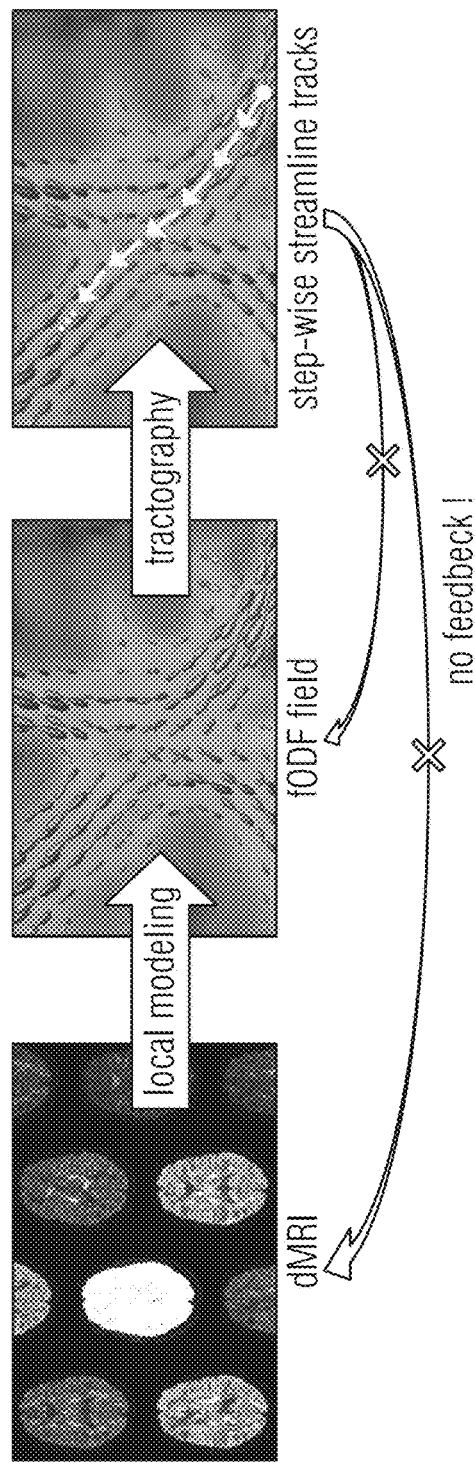
FIG. 1 schematically illustrates a model-based local tractography approach according to the prior art.
Figure 2:
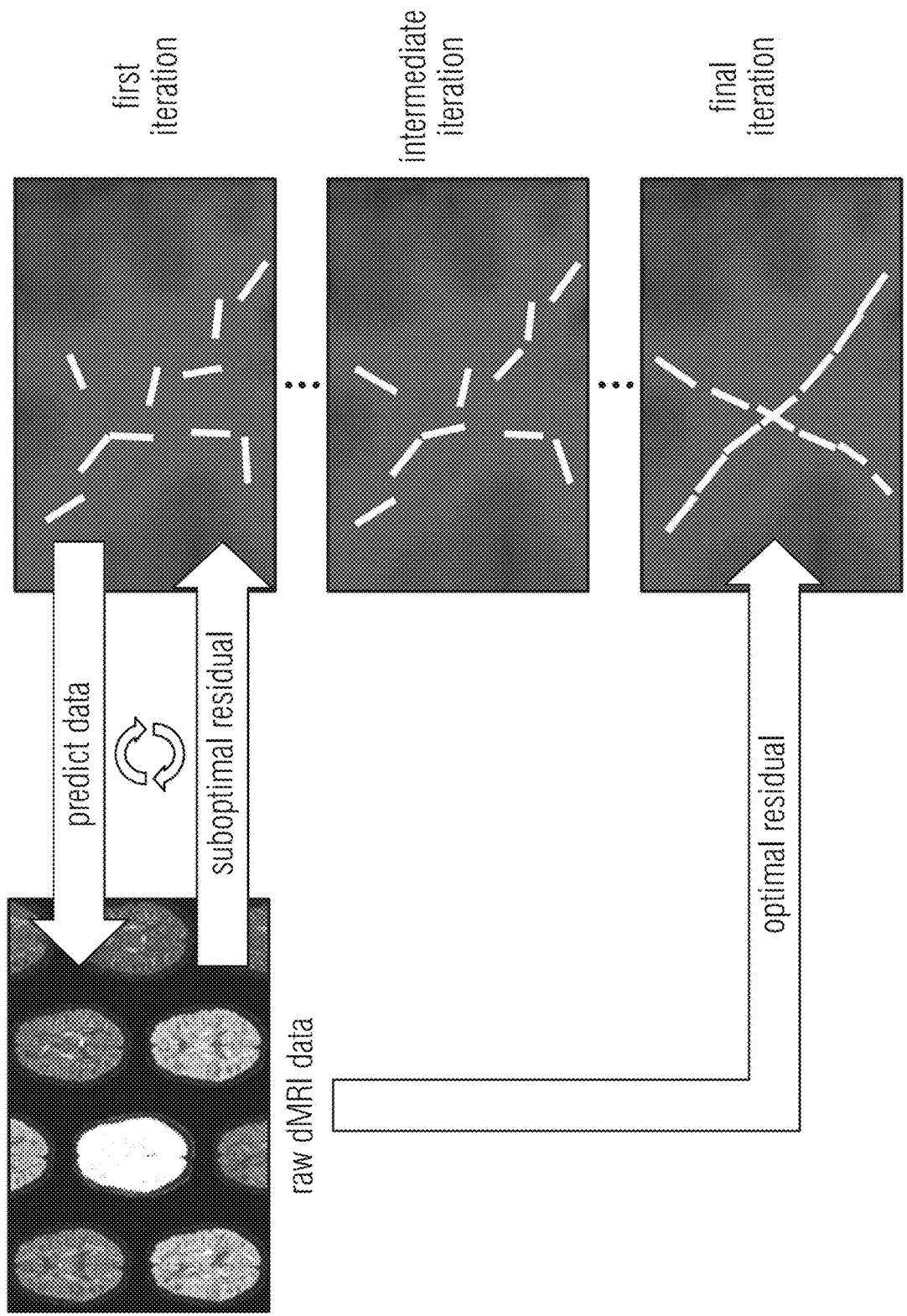
FIG. 2 schematically illustrates a global tractography approach according to the prior art.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of MRI are described. In MRI, signals (also called MR signal or MRI data) arise from the nuclear magnetic resonance (NMR) properties of tissues; these properties are stimulated by the application of fixed magnetic and variable radio frequency (RF) fields. The tissues may define a field of view (FOV) or a region/tissue of interest. The MRI data are typically defined in k-space. Based on the MRI data, MR images in the spatial domain can be determined. As a general rule, the term MR image denotes a 2-D or 3-D spatial dataset. Since pulse sequences that govern time-varying applications of these fields can be changed by the operator, MRI has the potential to create a number of different MR images representing different underlying signals. The contrast of the MR images can encode different physical observables. Proper combinations of pulse sequences can be used to differentiate fat from water, measure water diffusion, image bone, measure motion, and estimate blood flow.

As a general rule, to see a contrast between tissues—for example, different image intensities in the gray matter (GM) and white matter (WM) of the brain—the measured signals should be different in those tissues. In MRI, the ability to generate tissue contrast depends on both the intrinsic NMR properties of the tissues—such as, proton density $P_D$, transverse relaxation time $T_2$, and longitudinal relaxation time $T_1$—and the characteristics of the externally applied excitations (i.e., the pulse sequence). It is possible to control the tip angle $\alpha$ and the echo time $T_E$ of the RF excitation. It is also possible to control the interval between successive $\alpha$ pulses, i.e., the pulse repetition interval $T_R$. By adjusting/manipulating the above-mentioned characteristics (or controllable parameters) of the pulse sequence, it is possible to obtain MR images with different contrasts, such as $P_D$-weighted, $T_2$-weighted, $T_1$-weighted, and diffusion-weighted.

DMRI is a technique of providing a specific contrast. DMRI enables imaging the degree and orientation of molecular diffusion in tissue, i.e., obtaining diffusion-weighted MR images depicting random movements of molecules, particularly prevalent in liquids. There are various pulse sequences available for acquiring dMRI data. One exemplary way to measure diffusion in MRI is to use bipolar pulse directly after the excitation pulse and before the readout gradient. In practice, the bipolar pulse can be applied to all three gradient coils at the same time in order to give an arbitrary direction of diffusion sensitivity. Because some tissues (most notably, the WM of the human brain) show directionally dependent diffusion, the use of multiple directions can be used to, for example compute a diffusion tensor at each voxel. Such an approach is called diffusion tensor imaging (DTI).

Herein, the dMRI data may be 1D signals obtained from an RF coil of an MRI scanner, 2D/3D k-space images, or 2D/3D spatial images reconstructed from k-space images. The acquired dMRI data may be processed to obtain one or more tractograms of a global tractography of a tissue of interest, such as a whole-brain tractogram or a tractogram of a bundle of nerve fibers of the brain.

Figure 3:
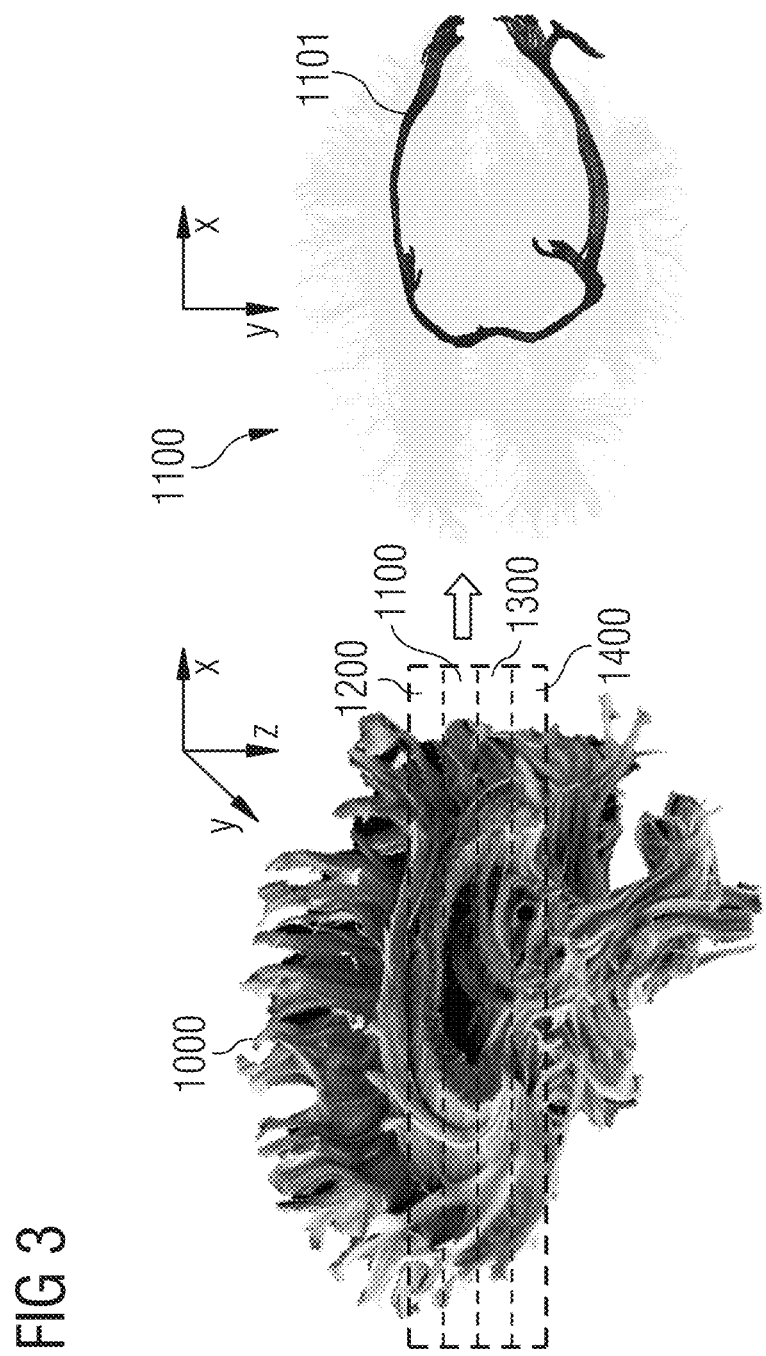
FIG. 3 schematically illustrates exemplary tractograms according to various examples.

FIG. 3 schematically illustrates a whole-brain (i.e., WM) tractogram 1000 and a tractogram 1100 of a bundle of nerve fibers 1101 of the brain. The whole-brain tractogram 1000 includes multiple slices or tractograms, such as 1100-1400, along the z direction. Each of the multiple slices 1100-1400 may include one or more bundles of nerve fibers. For example, the bundle of nerve fibers 1101 is one exemplary nerve bundle within the slice/tractogram 1100. The whole-brain tractogram 1000 can be divided into multiple slices or tractograms along the x direction, the y direction, or any other directions.

Hereinafter, a data-driven and model-free approach for determining one or more tractograms of a global tractography of a tissue of interest directly from dMRI data is disclosed. The approach may utilize machine-learning (ML), in particular deep-learning, techniques, and thereby facilitate model-free global tractography. Specifically, the approach enables fiber tracts reconstructions with better stability concerning noise and imaging artifacts which would benefit low-cost MRI scanners and applications with limited resolutions (e.g., infant dMRI); the model-free nature of the approach enables the approach not to rely or rely less strongly on dMRI data quality and acquisition pulse sequences, hence applicable for scanners with ultra-high magnetic field and using accelerated diffusion pulse sequences; the approach also facilitates fiber tracts reconstructions with a better agreement with the actual dMRI data that was acquired, enabling more biologically meaningful, quantitative features of the tissue microstructure; the direct connection between dMRI data and reconstructed tractograms, i.e., determining tractograms directly from dMRI data, can benefit the design of targeted pulse sequences and scanner models for microstructure informed tractography; additionally, the approach can facilitate the synergy of microstructure MRI and magnetic resonance fingerprinting (MRF) techniques, e.g., MRF could aid in designing optimal experiments for true quantitative microstructure features extracted from the reconstructed tractograms.

Hereinafter, techniques of determining one or more tractograms of a global tractography of a tissue of interest are described. At least one instance of dMRI data of the tissue of interest is obtained from an MRI scanner, or a database, such as a picture archiving and communication system (PACS). The one or more tractograms are generated by a trained ML algorithm based on the at least one instance of the dMRI data. For example, the tractogram 1100 of FIG. 3 can be generated by the trained ML algorithm based on dMRI data depicting the slice 1100, and the whole-brain tractogram 1000 can be generated by the trained ML algorithm based on dMRI data depicting the whole brain.

According to various examples of the disclosure, the tissue of interest may include a tissue of a brain, such as WM, of a neck, of a spinal cord, of a part of a peripheral nervous system, or of a muscle.

According to various examples of the disclosure, the acquisition of the dMRI data includes acquisitions using pulse sequences with variable values of a b-factor and with different gradient directions. The b-factor (in s/mm$^2$) indicates the degree of diffusion weighting of a pulse sequence, which depends on characteristics of diffusion gradients including a gradient amplitude, a gradient application time, a time interval between centers of the two diffusion gradients. The stronger the gradients, the longer they are applied and the more spread out in time, the greater the value of the b-factor.

The sensitivity of the pulse sequences is limited to diffusion in the direction of the gradients, so they may be repeated by applying diffusion gradients in at least 3 spatial directions, i.e., x, y, and z. Diffusion magnitude, calculated from the three diffusion images thus obtained, renders the image weighted in global diffusion (trace image). Two diffusion pulse sequences with different values of the b-factor can be used to quantitatively measure the degree of molecular mobility, for example by calculating the apparent diffusion coefficient (ADC).

Figure 4:
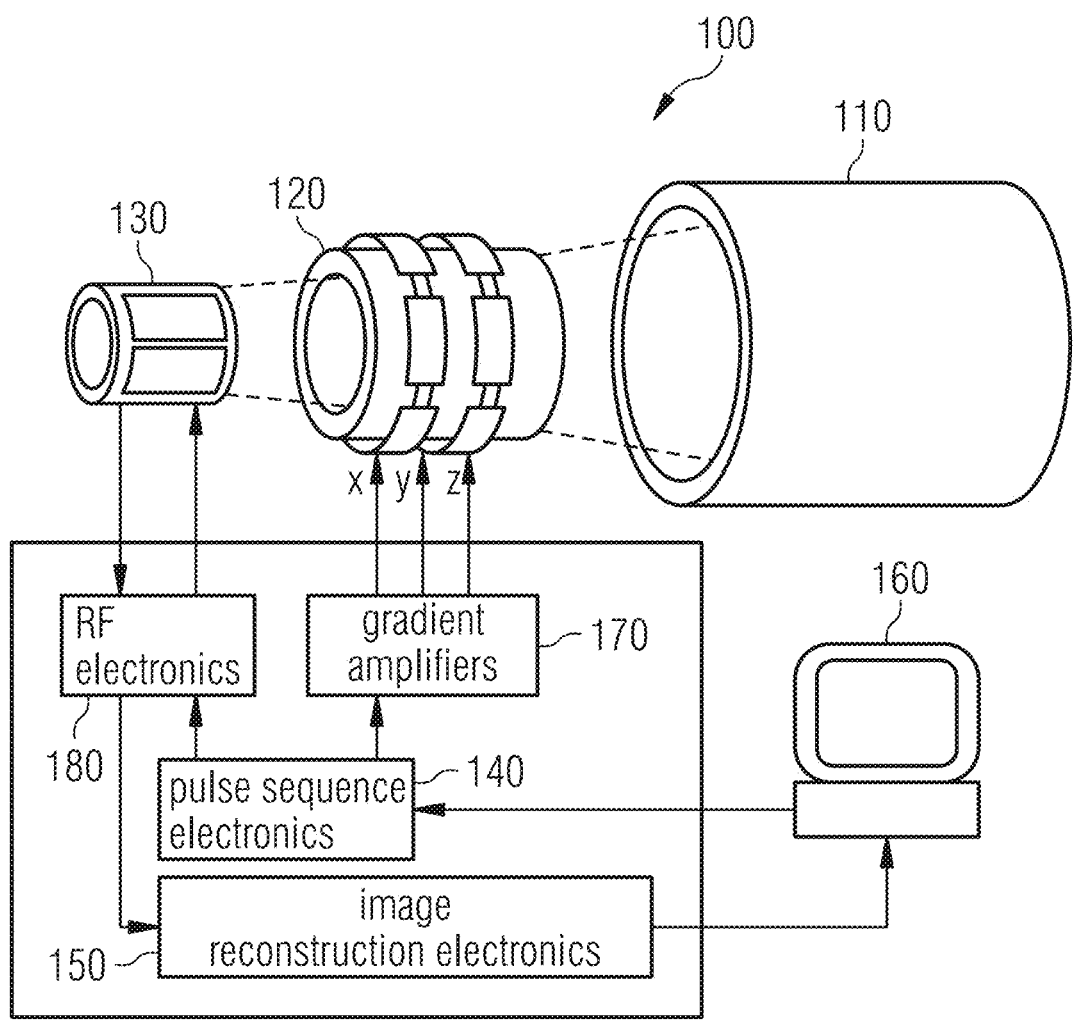
FIG. 4 schematically illustrates an MRI scanner according to various examples.

FIG. 4 illustrates aspects with respect to an MRI scanner 100. The MRI scanner 100 may be controlled to employ pulse sequences explained above to acquire dMRI data.

There are several principal components constituting an MRI scanner 100: the main magnet 110; a set of gradient coils 120 to provide switchable spatial gradients in the main magnetic field; radio frequency (RF) coils 130 (or resonators) for the transmission and reception of radio frequency pulses; pulse sequence electronics 140 for programming the timing of transmission signals (excitation pulse, gradient signals); image reconstruction electronics 150 and a human machine interface 160 for viewing, manipulating, and storing images.

A common type of the main magnet 110 used in MRI systems is the cylindrical superconducting magnet (typically with a 1 meter bore size). The main magnet 110 can provide a main magnet field with a field strength varying from 0.5 Tesla (21 MHz) to 3.0 Tesla (128 MHz), even 9 Tesla (383 MHz), along its longitudinal axis. The main magnetic field can align the magnetization of the nuclear spins of a patient along the longitudinal axis. The patient can be moved into the bore by a sliding table (not shown in FIG. 4).

The gradient coils 120 fit inside the bore of the main magnet 110 (after any active shimming coils, if present). The function of the gradient coils 120 is to provide a temporary change in the magnitude of the main magnetic field as a function of position in the bore of the main magnet 110. The gradient coils 120 provide a spatial encoding of the magnetic field strength, to thereby choose slices, such as 1100-1400 of FIG. 3, of the patient body for selective imaging. In this way, MRI can be tomographic—i.e., it can image slices. The gradient coils 120 also provide the means to spatially encode the voxels within a given image slice so that the individual echoes coming from each voxel can be discriminated and turned into an MR image. There are usually three orthogonal gradient coils, one for each of the physical x, y, and z directions. The gradients can be used for slice selection (slice-selection gradients), frequency encoding (readout gradients), and phase encoding along one or more phase-encoding directions (phase-encoding gradients). Hereinafter, the slice-selection direction will be defined as being aligned along the Z-axis; the readout direction will be defined as being aligned with the X-axis; and a first phase-encoding direction as being aligned with the Y-axis. A second phase-encoding direction may be aligned with the Z-axis. The directions along which the various gradients are applied are not necessarily in parallel with the axes defined by the gradient coils 120. Rather, it is possible that these directions are defined by a certain k-space trajectory which, in turn, can be defined by certain requirements of the respective MRI pulse sequences and/or based on anatomic properties of a patient. The gradient coils 120 usually coupled with the pulse sequence electronics 140 via gradient amplifiers 170.

RF pulses that are oscillating at the Larmor frequency applied around a sample of a tissue of interest causes nuclear spins to precess, tipping them toward the transverse plane. Once a spin system is excited, coherently rotating spins can induce RF currents (at the Larmor frequency) in nearby antennas, yielding measurable signals associated with the free induction decay and echoes. Thus, the RF coils 130 serve to both induce spin precession and to detect signals indicative of the precession of the nuclear spins. The RF coils 130 usually coupled with both the pulse sequence electronics 140 and the image reconstruction electronics 150 via RF electronics 180, respectively.

For creating such RF pulses, an RF transmitter (e.g., apart of the RF electronics 180) is connected via an RF switch (e.g., a part of the RF electronics 180) with the RF coils 130. Via an RF detection circuit (e.g., a part of the RF electronics 180), it is possible to detect the induced currents or signals by the spin system. In particular, it is possible to detect echoes; echoes may be formed by applying one or more RF pulses (spin echo) and/or by applying one or more gradients (gradient echo). The respectively induced currents or signals can correspond to raw MR data in k-space. According to various examples, the MR data in k-space can be processed using reconstruction techniques, such as MRF, to obtain MR images. Such a reconstruction can include an Inverse Fourier Transform (IFT) from k-space to spatial space. Such reconstruction can also include procedures to reduce undersampling/aliasing artifacts and/or noise.

According to various examples of this disclosure, MRF may facilitate pulse sequences designed for targeted microstructure properties, such as pulse sequences for dMRI. As such, combining MRF and microstructure MRI, such as dMRI, becomes more and more attractive. MRF may be used for multicompartment mapping. For example, two tissue species, e.g., WM and GM in a brain, with different $T_2$ in a voxel can classically be resolved using a spin echo acquisition with varying $T_E$. The observed biexponential decays are however very similar to deviations from the monoexponential decay due to the microstructure. By using an optimized MRF acquisition, the more complex and thereby unique signal evolution from a voxel containing several tissues can more likely be distinguished from other observed signals.

Techniques facilitating the synergy of microstructure MRI, e.g., dMRI, and MRF and disclosed in non-patent literature—Kiselev, Valerij G., Gregor Korzdorfer, and Peter Gall. "Toward Quantification: Microstructure and Magnetic Resonance Fingerprinting." Investigative Radiology 56.1 (2021): 1-9.—can be applied in this disclosure.

Generally, it would be possible to use separate coil assemblies for applying RF pulses on the one hand and for acquiring MR data on the other hand (not shown in FIG. 4). For example, for applying RF pulses, a comparably large body coil (not shown in FIG. 4) can be used; while for acquiring MR data, a surface coil assembly including an array of comparably small coils could be used. For example, the surface coil assembly could include 32 individual RF coils and thereby facilitate parallel acquisition techniques (PATs) relying on spatially-offset coil sensitivities. Example PATs are, e.g., PATs include, e.g., GRAPPA, see: Griswold M A, Jakob P M, Heidemann R M, Nittka M, Jellus V, Wang J, Kiefer B, Haase A. Generalized autocalibrating partially parallel acquisitions (GRAPPA). Magn Reson Med 2002; 47: 1202-1210.

PATs include, e.g., SENSE, see: Pruessmann, Klaas P., et al. "SENSE: sensitivity encoding for fast MRI." Magnetic resonance in medicine 42.5 (1999): 952-962.

PATs include, e.g., CAIPIRINHA, see: Breuer, Felix A., et al. "Controlled aliasing in volumetric parallel imaging (2D CAIPIRINHA)." Magnetic Resonance in Medicine: An Official Journal of the International Society for Magnetic Resonance in Medicine 55.3 (2006): 549-556.

The human machine interface 160 might include at least one of a screen, a keyboard, a mouse, etc. With the human machine interface 160, a user input can be detected and output to the user can be implemented. For example, with the human machine interface 160, it is possible to select and configure the scanning pulse sequence, graphically select the orientation of the scan planes to image, review images obtained, and change variables in the pulse sequence to modify the contrast between tissues. The human machine interface 160 is respectively connected to the pulse sequence electronics 140 and the image reconstruction electronics 150, such as an array processor, which performs the image reconstruction.

The pulse sequence electronics 140 may include a GPU and/or a CPU and/or an application-specific integrated circuit and/or a field-programmable array. The pulse sequence electronics 140 may implement various control functionality with respect to the operation of the MRI scanner 100, e.g. based on program code loaded from a memory. For example, the pulse sequence electronics 140 could implement a sequence control for time-synchronized operation of the gradient coils 120, both the RF transmitter and the RF detection circuit of the RF electronics 180.

The image reconstruction electronics 150 may include a GPU and/or a CPU and/or an application-specific integrated circuit and/or a field-programmable array. The image reconstruction electronics 150 can be configured to implement post-processing for reconstruction of MR images. The image reconstruction electronics 150 can also perform reduction of undersampling/aliasing artifacts and/or noise. The image reconstruction electronics 150 can execute ML algorithms, etc.

The pulse sequence electronics 140 and the image reconstruction electronics 150 may be a single circuit, or two separate circuits.

The MRI scanner 100 may be connectable to a database (not shown in FIG. 4), such as a PACS located within a local network of a hospital, for storing acquired MR data, and/or reconstructed MR images.

According to this disclosure, after acquiring the MR data, i.e., dMRI data, the dMRI data may be applied to a trained ML algorithm to generate one or more tractograms depicting connectivity of nerve fibers or muscle fibers. Hereinafter, the WM of the brain will be used as an example of the tissue of interest to describe various techniques of this disclosure.

Figure 5:
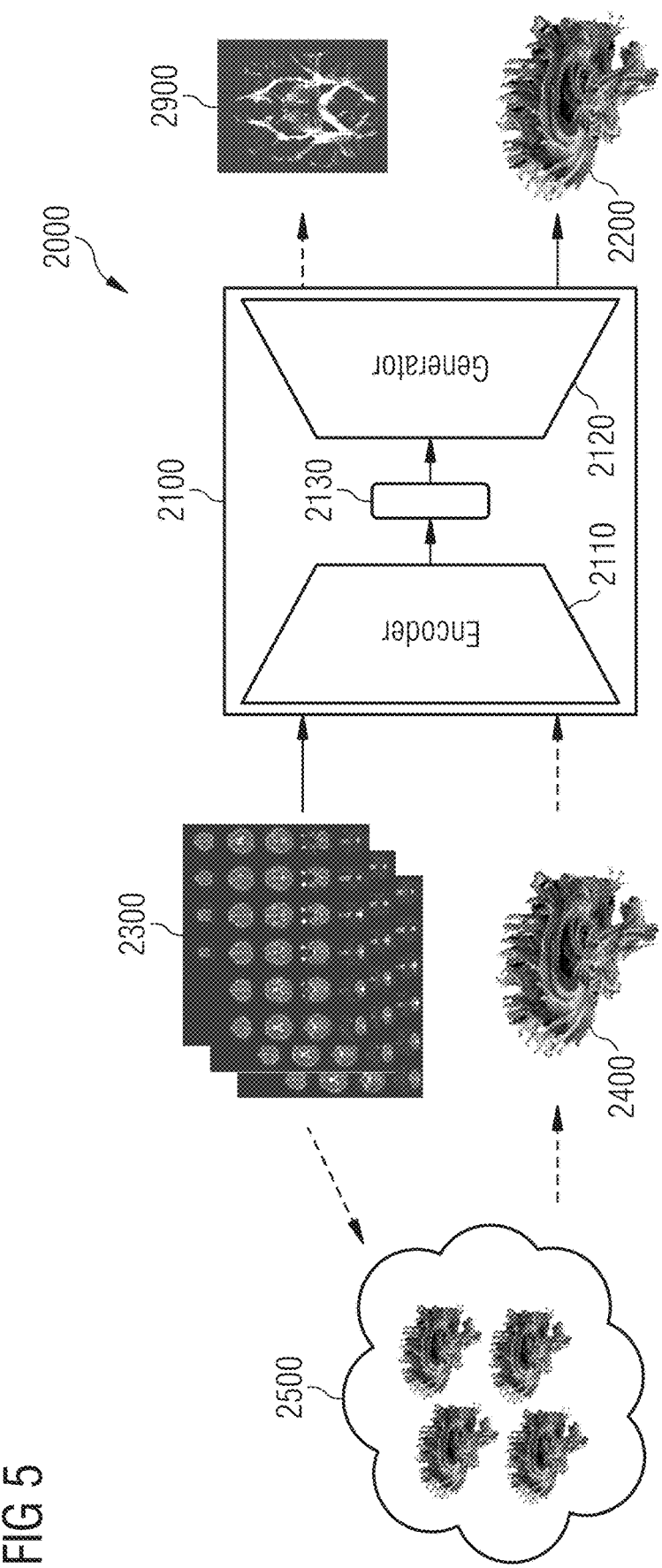
FIG. 5 schematically illustrates a processing pipeline according to various examples.

FIG. 5 schematically illustrates a processing pipeline 2000 for determining one or more tractograms 2200 of a global tractography according to various examples. Details with respect to the processing pipeline 2000 will described below.

Arrows with a dashed line indicate optional operations.

The processing pipeline 2000 includes an ML algorithm 2100. The ML algorithm 2100 includes trainable parameters and hyperparameters. After training the ML algorithm 2100 by updating the trainable parameters and hyperparameters, one or more instance of input dMRI data 2300 is applied to the trained ML algorithm 2100 to generate the one or more tractograms 2200.

The processing pipeline 2000 may receive input from the MRI scanner 100 of FIG. 4 or a database (not shown in FIG. 5), such as a PACS. The dMRI data may be obtained from the MRI scanner 100 or from the PACS. The input dMRI data 2300 may be acquired using pulse sequences with variable values of a b-factor and with different gradient directions. The input dMRI data 2300 may be 1D signals obtained from the RF coils 130 of the MRI scanner 100, 2D/3D k-space images, or 2D/3D spatial images reconstructed by the image reconstruction electronics 150 from k-space images.

As a general rule, various kinds and types of ML algorithms can be used herein. For instance, it would be possible to use a deep neural network (DNN), e.g., a convolutional neural network (CNN) having one or more convolutional layers performing convolutions between the input data and a kernel. It would also be possible to use a support vector machine (SVM), a recurrent neural networks (RNN), such as long/short term memory (LSTM) network, a generative adversarial network (GAN), a deep residual network (DRN).

According to the disclosure, various training methods of ML algorithms may be applied to train the ML algorithm 2100, such as supervised learning, un-supervised learning, semi-supervised learning, reinforce learning and etc.

In general, the ML algorithm 2100 may be executed by a node of an edge computing system, or by a cloud computing system, or by the MRI scanner 100 of FIG. 4, for example by the image reconstruction electronics 150.

Optionally or additionally, the ML algorithm 2100 may further generate, based on the input dMRI data 2300, at least one of an apparent diffusion coefficient (ADC) map, a fractional anisotropy (FA) map, and a track-density imaging (TDI) map.

According to various examples, the ML algorithm 2100 may include an (deep-learning (DL)) encoder network 2110 and a (DL) generator network 2120. The encoder network 2110 obtains the input dMRI data 2300 as input and outputs learned latent representation 2130 of the input dMRI data 2300. Then, the generator network 2120 obtains the learned latent representation 2130 as input and output the one or more tractograms 2200, which can also be named as reconstructed tractogram.

Optionally or additionally, further information such as prior tractogram knowledge may be used to facilitate the generation of the one or more tractograms 2200. For example, at least one predetermined tractogram 2400 associated with the input dMRI data 2300 may be obtained and input to the trained ML algorithm 2100 together with the input dMRI data 2300 to generate the one or more tractograms 2200. The at least one predetermined tractogram 2400 and the input dMRI data 2300 may be concatenated before inputting to the ML algorithm.

According to various examples, the at least one predetermined tractogram 2400 may be obtained by directly processing the input dMRI data 2300 using a conventional tractography algorithm available in the prior art or a further ML algorithm (not shown in FIG. 5). For example, the conventional method, such as a local tractography method or a model-based method, or the further ML algorithm may generate coarse-grained tractograms based on the input dMRI data 2300. Then, the ML algorithm 2100 may generated fine-grained tractograms, i.e., the one or more tractograms 2200 of a global tractography.

According to various examples, the processing pipeline 2000 may further include obtaining or acquiring predetermined tractograms from a tractogram database 2500 storing predetermined tractograms associated with one or more tissue of interests of patients. The at least one predetermined tractogram 2400 may be retrieved from the tractogram database 2500.

For example, after performing a scan of the brain of a patient using the MRI scanner 100 of FIG. 4, the acquired dMRI data may be processed by a conventional method in the prior art or a further ML algorithm, such as a rule-based algorithm, to generate one or more tractograms matching the acquired dMRI data and accordingly the generated one or more tractograms is stored in the tractogram database 2500.

When performing a new scan and generating one or more new tractograms based on the newly acquired dMRI data or generating one or more fine-grained tractograms based on previously acquired dMRI data, for example stored in a database, at least one predetermined tractogram 2400 associated with the at least one instance of the input dMRI data 2300 may be obtained/retrieved from the tractogram database 2500 based on the input dMRI data 2300.

According to various examples, both the acquired dMRI data and the stored predetermined tractograms may include personal health information (PHI) or information identifying the patient, such as a patient name and an identity number, and position information, such as coordinates of the center, associated with each tractogram and with each slice of the acquired dMRI data. I.e., the PHI and position information can facilitate to obtain/retrieve the at least one predetermined tractogram 2400.

When obtaining or retrieving the at least one predetermined tractogram 2400 from the tractogram database 2500, the PHI and the position information associated with the input dMRI data 2300 may be extracted and used to obtain the at least one predetermined tractogram 2400 having the same PHI as the extracted PHI and the same position information as the extracted position information. If it is impossible to obtain at least one predetermined tractogram 2400 having the same position information as the extracted position information, it is possible to retrieve a predetermined tractogram having the nearest position to the extracted position, i.e., the nearest tractogram to the extracted position. For example, if the extracted position information indicates a tractogram overlapping with the bottom part of tractogram 1100 and the top part of tractogram 1300 of FIG. 3, both tractograms 1100 and 1300 are the nearest tractograms and may be determined as the predetermined tractogram 2400 associated with the input dMRI data 2300. Optionally or additionally, it is also possible to select, from both tractograms 1100 and 1300, one tractogram which is closer to the extracted position as the nearest tractogram. I.e., the nearest tractograms can be determined based on a distance metric. The distance metric can be based on the position information.

The tractogram database 2500 may be implemented by the PACS, i.e., the input dMRI data 2300 and the predetermined tractogram 2400 may be stored in the same database.

According to various example, the processing pipeline 2000 may further include a retrieval network (not shown in FIG. 5), e.g., a DNN, for retrieving/obtaining the predetermined tractogram 2400 from the tractogram database 2500.

Figure 6:
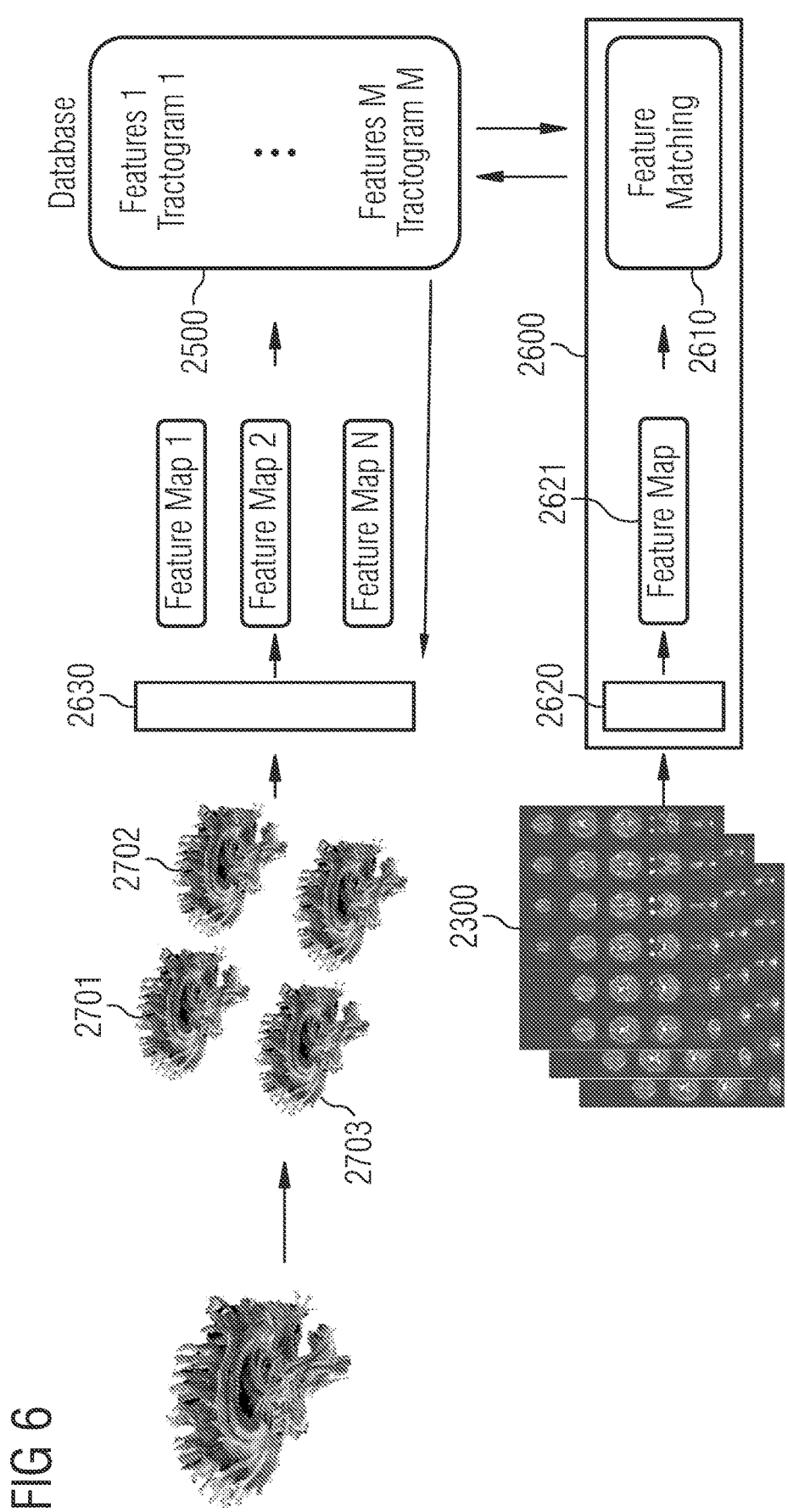
FIG. 6 schematically illustrates an exemplary retrieval network according to various examples.

FIG. 6 schematically illustrates an exemplary retrieval network 2600 of the processing pipeline 2000 for data processing according to various examples. The data processing can be implemented in software and/or hardware. The retrieval network 2600 can retrieve predetermined tractograms from a tractogram database. Details with respect to the retrieval network 2600 are described below.

The retrieval network 2600 includes, in the illustrated example, a feature-extracting sub-network 2620 and a feature matching sub-network 2610. The feature-extracting sub-network 2620 obtains the input dMRI data 2300 and extracts/outputs a feature map 2621 representing the input dMRI data 2300. The feature matching sub-network 2610 has two branches for respectively receiving the feature map 2621 representing the input dMRI data 2300 and a feature map representing a predetermined tractogram in the tractogram database 2500, and accordingly compares the obtained two feature maps to determine if they are substantively the same or not. If it is determined that they are substantively the same, the corresponding predetermined tractogram in the tractogram database 2500 matching with the feature map that is substantively the same as the feature map 2621 representing the input dMRI data 2300 is then determined as the predetermined tractogram associated with the input dMRI data 2300 or the nearest tractograms to a tractogram representing the input dMRI data 2300. Otherwise, the feature matching sub-network 2610 may obtain a further feature map representing a further predetermined tractogram in the tractogram database 2500 and compare the further feature map with the feature map 2621 representing the input dMRI data 2300 to determine if they are substantively the same or not.

For example, the feature matching sub-network 2610 may obtain feature map 1 representing a predetermined tractogram 1 from the tractogram database 2500 and then compare the feature map 1 with the feature map 2621 representing the input dMRI data 2300. If they are substantively the same, the predetermined tractogram 1 is determined as the predetermined tractogram associated with the input dMRI data 2300. Otherwise, the feature matching sub-network 2610 may respectively obtain, from the tractogram database 2500, feature map 2 to feature map N, and respectively compare each of the obtained feature maps from the tractogram database 2500 with the feature map 2621 representing the input dMRI data 2300, e.g., until obtaining the feature maps substantively the same as the feature map 2621.

According to various examples, the feature matching sub-network 2610 may respectively obtain all the feature maps representing predetermined tractograms from the tractogram database 2500, and respectively compare each of the obtained feature maps from the tractogram database 2500 with the feature map 2621 representing the input dMRI data. The result of each comparison may be a value indicating a similarity between the compared two feature maps. After performing comparison with all the feature maps representing predetermined tractograms from the tractogram database 2500, all the determined values may be sorted to determine the largest value and the predetermined tractograms associated with the largest value are determined as the predetermined tractogram associated with the input dMRI data 2300, i.e., the nearest tractograms.

According to various examples, the nearest tractograms can be determined based on a similarity metric. The similarity metric can be based on the feature maps as outlined above. The similarity metric can be also based on dMRI data or tractograms.

For example, the retrieval network 2600 may include a further feature-extracting sub-network 2630. The further feature-extracting sub-network 2630 obtains predetermined tractograms from the tractogram database 2500 and generates feature maps representing the obtained predetermined tractograms. The generated feature maps may be stored in the tractogram database 2500. The generated feature maps are also respectively compared with the feature map 2621 representing the input dMRI data 2300 using the feature matching sub-network 2610 to determine the nearest tractograms. Here, the predetermined tractograms may be replaced by the dMRI data to generate feature maps representing the predetermined tractograms. Thus, the similarity metric is based on dMRI data.

According to various examples, each predetermined tractogram in the tractogram database 2500 may have multiple deformed versions 2701-2703 and each of the multiple deformed versions 2701-2703 has a feature map representing the respective deformed version 2701-2703 of the corresponding predetermined tractogram. Deformed can pertain to, e.g., skewed, rotated, and/or scaled, etc. For example, the feature maps 1-N may respectively represent different deformed versions and the comparison procedure explained above may apply to the deformed versions of each predetermined tractogram in the tractogram database 2500.

According to various examples, the tractogram database 2500 may store a large number of predetermined tractograms, and/or deformed versions of the predetermined tractograms, and/or dMRI data associated with the predetermined tractograms, and/or feature maps associated with the predetermined tractograms. For example, corresponding predetermined tractograms, and/or deformed versions, and/or dMRI data, and/or feature maps associated with the same position of the same tissue of interest of the same patient may be stored as a tuple in the tractogram database 2500. Thus, it is possible to retrieve corresponding data based on PHI and position information.

Herein, the feature matching sub-network 2610 may be implemented using a Siamese neural network disclosed in a non-patent literature—Koch, Gregory, Richard Zemel, and Ruslan Salakhutdinov. "Siamese neural networks for one-shot image recognition." ICML deep learning workshop. Vol. 2. 2015; and/or, the feature-extracting sub-network 2620 may be implemented using a deep sets architecture based on VGG dieclosed in a non-patent literature—Simonyan, Karen, and Andrew Zisserman. "Very deep convolutional networks for large-scale image recognition." arXiv preprint arXiv:1409.1556 (2014); further feature-extracting sub-network 2630 may share the same architecture as the feature-extracting sub-network 2620.

According to various examples, the multiple deformed versions 2701-2703 of each predetermined tractogram may be generated and corresponding feature maps 1-N may be extracted using a recurrent Pointnet++ encoder-decoder architecture as disclosed in a combination of non-patent literatures—Cho, Kyunghyun, et al. "On the properties of neural machine translation: Encoder-decoder approaches." arXiv preprint arXiv:1409.1259 (2014) and Qi, Charles R., et al. "Pointnet++: Deep hierarchical feature learning on point sets in a metric space." arXiv preprint arXiv:1706.02413 (2017).

Figure 7:
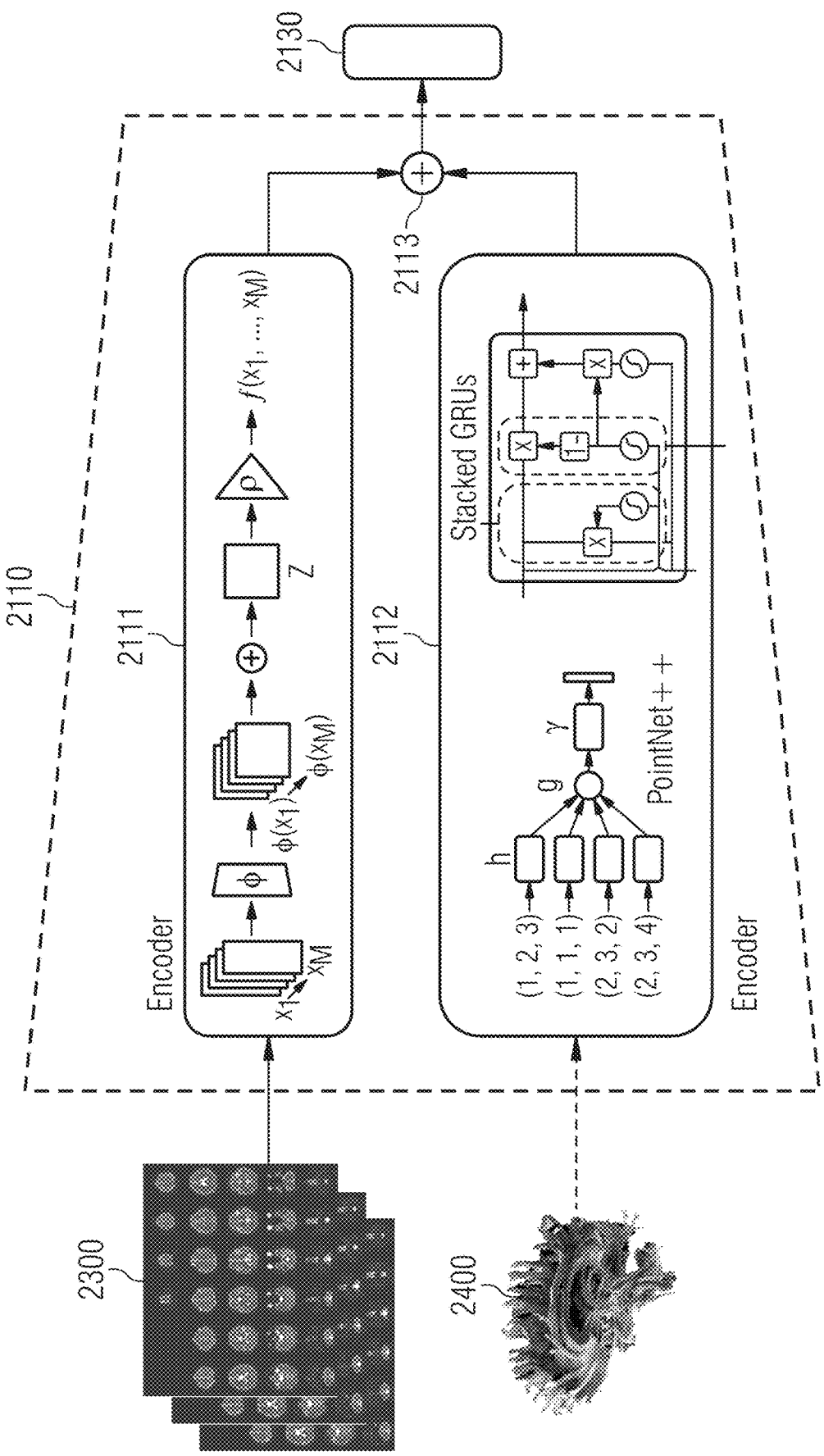
FIG. 7 schematically illustrates an exemplary encoder network according to various examples.

According to various examples, as shown in FIG. 7, the encoder network 2110 of the ML algorithm 2100 of FIG. 5 may include a first encoder branch 2111 and a second encoder branch 2112. The input dMRI data 2300 is fed to the first encoder branch 2111 to generate a first feature representing the input dMRI data 2300, and the at least one predetermined tractogram 2400 associated with the input dMRI data 2300 is fed to the second encoder branch 2112 to generate a second feature representing the at least one predetermined tractogram 2400. The first feature and the second feature are then combined to obtain a combination of both features, i.e., the learned latent representation 2130. The learned latent representation 2130 is fed to the generator network 2120 to generate the one or more tractograms 2200.

According to various examples, the first feature and the second feature are combined by using a concatenation operation or a pooling layer 2113.

According to the disclosure, the first encoder branch 2111 may be implemented by using deep sets encoder network as disclosed in a non-patent literature—Zaheer, Manzil, et al. "Deep sets." arXiv preprint arXiv:1703.06114 (2017); and/or the second encoder branch 2112 may be implemented by using a recurrent version of Pointnet++ as disclosed in a combination of non-patent literatures—Cho, Kyunghyun, et al. "On the properties of neural machine translation: Encoder-decoder approaches." arXiv preprint arXiv: 1409.1259 (2014) and Qi, Charles R., et al. "Pointnet++: Deep hierarchical feature learning on point sets in a metric space." arXiv preprint arXiv:1706.02413 (2017).

According to various examples, the generator network 2120 of the ML algorithm 2100 of FIG. 5 may include multiple branches. The multiple branches may respectively generate the one or more tractograms 2200, the ADC map, the FA map, and the TDI map, i.e., one or more auxiliary maps 2900.

Figure 8:
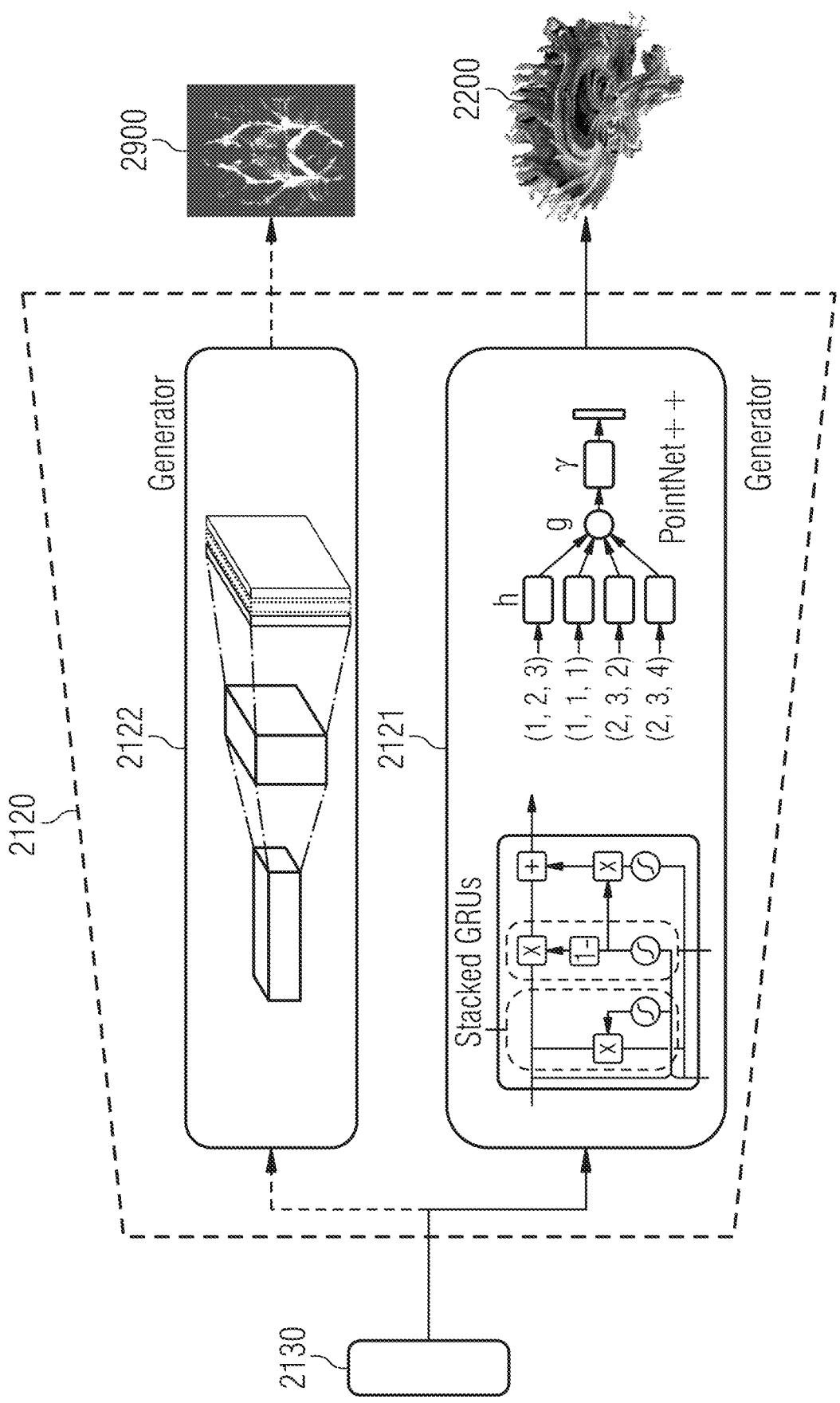
FIG. 8 schematically illustrates an exemplary generator network according to various examples.

Alternatively, as shown in FIG. 8, the generator network 2120 may include a first generator branch 2121 and a second generator branch 2122. The first generator branch 2121 generates the one or more tractograms 2200 based on the learned latent representation 2130, and the second generator branch 2122 generates at least one of the ADC map, the FA map, and the TDI map based on the learned latent representation 2130, i.e., at least one auxiliary map 2900.

According to various examples, the first generator branch 2121 may be implemented by using a recurrent version of a Pointnet++ generator as disclosed in a combination of non-patent literatures—Cho, Kyunghyun, et al. "On the properties of neural machine translation: Encoder-decoder approaches." arXiv preprint arXiv:1409.1259 (2014) and Qi, Charles R., et al. "Pointnet++: Deep hierarchical feature learning on point sets in a metric space." arXiv preprint arXiv:1706.02413 (2017); and/or the second generator branch 2122 may be implemented by using a multi-modal 2D CNN generator. Exemplary multi-modal 2D CNN generator may be implemented using networks disclose in non-patent literature—Gao, Jing, et al. "A survey on deep learning for multimodal data fusion." Neural Computation 32.5 (2020): 829-864.

Figure 9:
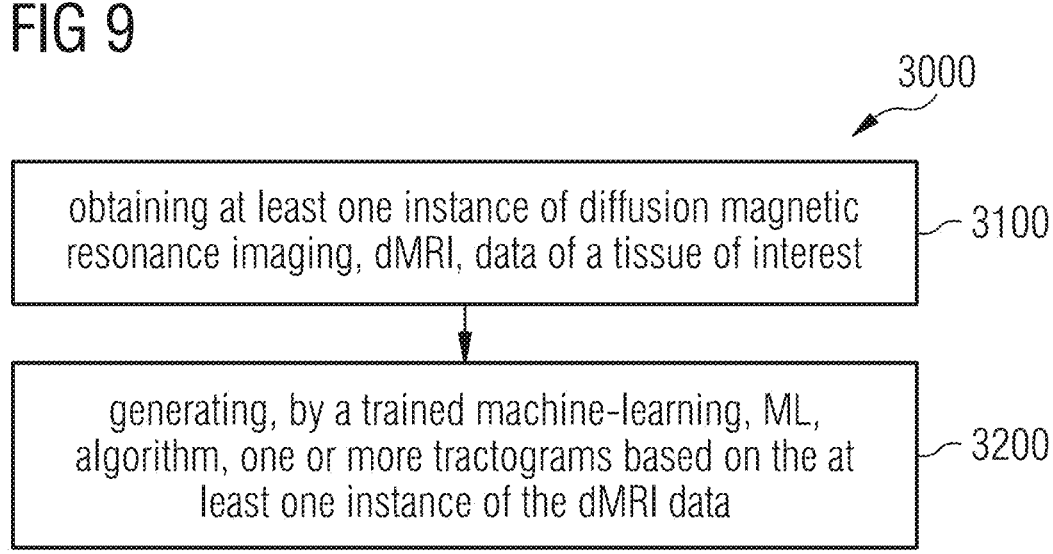
FIG. 9 is a flowchart of a method according to various examples.

FIG. 9 schematically illustrates an exemplary method 3000 for determining one or more tractograms of a global tractography of a tissue of interest according to various examples. The method 3000 may be executed by a computer including at least one processing unit (processor), or by the image reconstruction electronics 150 of the MRI scanner 100 of the processing pipeline 2000 of FIG. 5. The method may, at least in parts, be executed by a cloud server or anode of an edging computing system. Details of the method 3000 are described in connection with the processing pipeline 2000 below.

Block 3100: obtaining at least one instance of diffusion magnetic resonance imaging, dMRI, data 2300 of the tissue of interest.

Block 3200: generating, by a trained ML algorithm 2100, the one or more tractograms 2200 based on the at least one instance of the dMRI data 2300.

Optionally or additionally, the method 3000 may further include generating, based on the at least one instance of the dMRI data 2300, at least one of an apparent diffusion coefficient map, a fractional anisotropy map, and a track-density imaging map.

Optionally or additionally, the method 3000 further includes obtaining at least one predetermined tractogram 2400 associated with the at least one instance of the dMRI data 2300. The one or more tractograms 2200 is generated further based on the at least one predetermined tractogram 2400. For example, the at least one instance of the dMRI data 2300 and the obtained at least one predetermined tractogram 2400 may be concatenated and the trained ML algorithm 2100 may be then applied to the concatenated data.

According to various examples, the obtaining of the at least one predetermined tractogram 2400 may include applying a rule-based algorithm to the at least one instance of the dMRI data 2300 to obtain the at least one predetermined tractogram 2400.

According to various examples, the obtaining of the at least one predetermined tractogram 2400 may include retrieving, from a tractogram database 2500, one or more of the nearest tractograms to a tractogram representing the at least one instance of the dMRI data 2300. The at least one predetermined tractogram 2400 is selected from the one or more of the nearest tractograms. The nearest tractograms may be determined based on a distance metric or a similarity metric as described above.

According to various examples, the retrieving of the one or more of the nearest tractograms 2400 may include extracting, from the at least one instance of the dMRI data 2300, a feature map 2621 representing the at least one instance of the dMRI data 2300; and comparing the feature map 2621 representing the at least one instance of the dMRI data 2300 with each feature map 1-N representing each predetermined tractogram in the tractogram database 2500. For example, the retrieving of the one or more of the nearest tractograms 2400 may be executed using the retrieval network 2600 of the processing pipeline 2000 as shown in FIG. 6.

According to various examples, each predetermined tractogram in the tractogram database 2500 may have multiple deformed versions 2701-2703 and each of the multiple deformed versions 2701-2703 may have a feature map 1-N representing the respective deformed version 2701-2703 of the corresponding predetermined tractogram.

According to various example, the method 3000 may further include adjusting characteristics of a pulse sequence for obtaining the at least one instance of the dMRI data 2300 based on the generated one or more tractograms 2200. For example, it is possible to adjust the tip angle $\alpha$ and the echo time $T_E$ of the RF excitation of the pulse sequence. It is also possible to adjust the interval between successive $\alpha$ pulses, i.e., the pulse repetition interval $T_R$.

Techniques of adjusting characteristics of a pulse sequence for microstructure MRI, e.g., dMRI, and disclosed in non-patent literature—Kiselev, Valerij G., Gregor Korzdorfer, and Peter Gall. "Toward Quantification: Microstructure and Magnetic Resonance Fingerprinting." Investigative Radiology 56.1 (2021): 1-9.—can be applied in this disclosure.

Before applying the at least one instance of the dMRI data 2300 to the ML algorithm 2100 to generate the one or more tractograms 2200, the ML algorithm 2100 needs to be trained. The ML algorithm 2100 may be trained end-to-end in a supervised, semi-supervised or self-supervised way. In the supervised or semi-supervised settings, the ML algorithm 2100 is trained on dMRI data and tractogram pairs with tractograms generated from traditional methods and refined manually or in a semi-automatic way.

According to the disclosure, the encoder network 2110 and the generator network 2120 of the ML algorithm 2100 may be trained separately using different sets of training data based on supervised learning techniques. Each training process can include determining a loss value based on a comparison between a prediction of the respective one of the encoder network 2110 and the generator network 2120 and a ground truth. A loss function can provide the loss value by performing the comparison. Based on the loss value, it is then possible to adjust the weights of the encoder network 2110 and the generator network 2120, respectively. Here, an optimization algorithm, e.g., gradient descent, can be employed. Backpropagation can be an alternative.

On the other hand, the encoder network 2110 and the generator network 2120 of the ML algorithm 2100 may be trained jointly, i.e., the two neural networks may be regarded as a whole and parameter values of both neural networks are updated together by using, for example, back propagation in a joint optimization process based on a common loss value. This corresponds to end-to-end training.

Employing the ML algorithm 2100 trained using appropriate sets of training data provides a robust way of processing the dMRI data. The ML algorithm 2100 may deal with complex dMRI data and provide more accurate results, i.e., tractograms, than other prior art tracgography techniques.

According to various examples, each of the encoder network 2110 and the generator network 2120 of the ML algorithm 2100 may be trained using different training techniques, respectively. For example, the encoder network 2110 may be trained by using supervised learning, and the generator network 2120 may be trained by using unsupervised learning.

Figure 10:
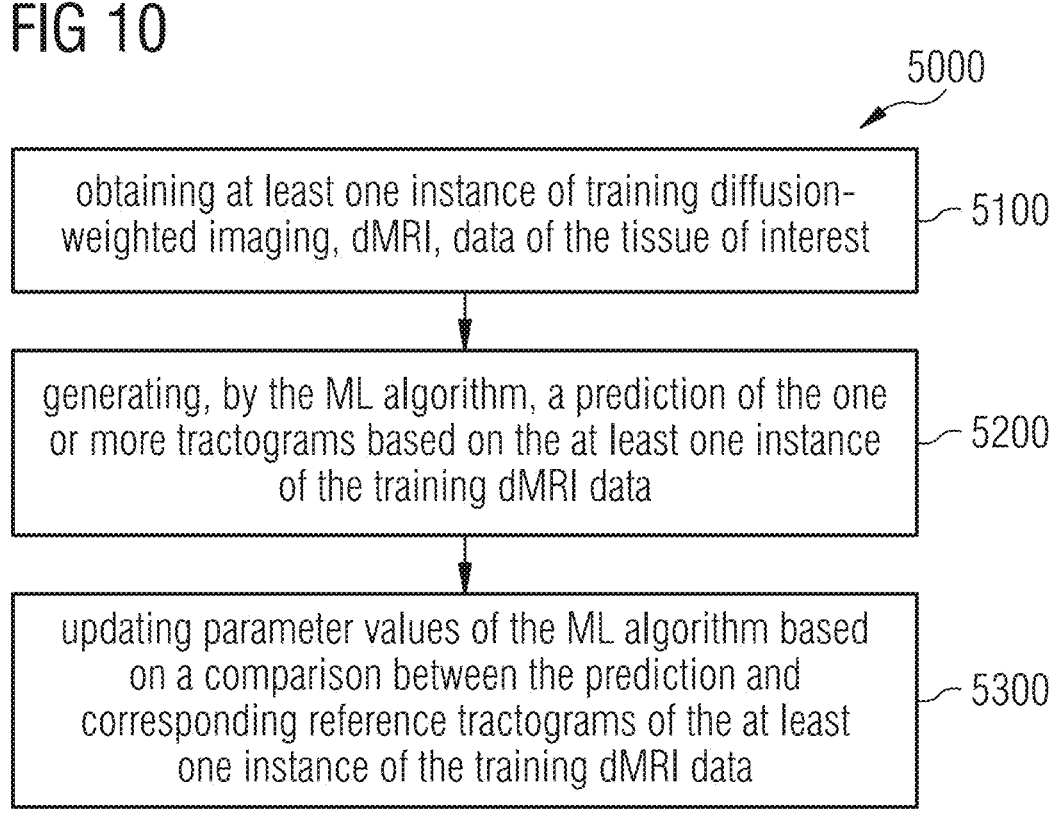
FIG. 10 is a flowchart of a method according to various examples.

FIG. 10 is a flowchart of a method 5000 of performing a training of the ML algorithm 2100 of FIG. 5 according to various examples. The method 5000 utilizes supervised learning. Details of the method 5000 are described below.

Block 5100: obtaining at least one instance of training diffusion-weighted imaging, dMRI, data of the tissue of interest.

For example, the at least one instance of training dMRI data may be obtained from a database, such as the PACS.

Block 5200: generating, by the ML algorithm 2100, a prediction of the one or more tractograms based on the at least one instance of the training dMRI data.

Block 5300: updating parameter values of the ML algorithm 2100 based on a comparison between the prediction and corresponding reference tractograms of the at least one instance of the training dMRI data.

According to various examples, the reference tractograms of the at least one instance of the training dMRI data may be determined by using a rule-based algorithm available in the prior art, e.g., a global or local tractography algorithm.

Figure 11:
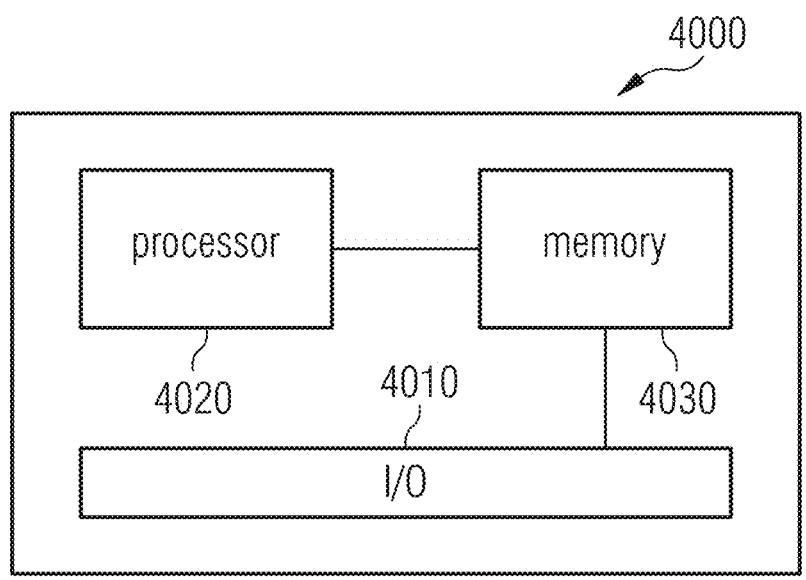
FIG. 11 is a block diagram of a system according to various examples.

FIG. 11 is a block diagram of a system 4000 according to various examples. The system 4000 provides a functionality of determining one or more tractograms of a global tractography of a tissue of interest based on the method 3000.

The system 4000 may include at least one processor 4020, at least one memory 4030, and at least one input/output interface 4010. The at least one processor 4020 is configured to load program code from the at least one memory 4030 and execute the program code. The program code may include code for implementing the ML algorithm 2100. Upon executing the program code, the at least one processor 4020 performs the method 3000 or 5000.

According to the disclosure, an MRI scanner, such as the MRI scanner 100 of FIG. 4 may include the system 4000 of FIG. 11. The MRI scanner may determine one or more tractograms of a global tractography of a tissue of interest while performing a scan of the tissue of interest, such as WM of a brain.

Alternatively, the system 4000 may be embedded in, such as the image reconstruction electronics 150 of the MRI scanner 100, or connected with the MRI scanner 100 and thereby the MRI scanner 100 may be also configured to perform the method 3000 or 5000.

Summarizing, techniques have been described that facilitates model-free global tractography. Specifically, the technique enables to provide fiber tracts reconstructions with better stability concerning noise and imaging artifacts which would benefit low-cost MRI scanners and applications with limited resolutions (e.g., infant dMRI); the model-free nature of the technique enables the technique not to rely on dMRI data quality and acquisition pulse sequences, hence applicable for scanners with ultra-high magnetic field and using accelerated diffusion pulse sequences; the technique also facilitates fiber tracts reconstructions with a better agreement with the actual dMRI data was acquired, enabling more biologically meaningful, quantitative features of the tissue microstructure; the direct connection between dMRI data and reconstructed tractograms, i.e., determining tractograms directly from dMRI data, can benefit the design of targeted pulse sequences and scanner models for microstructure informed tractography; additionally, the technique can facilitate the synergy of microstructure MRI and magnetic resonance fingerprinting (MRF) techniques, e.g., MRF could aid in designing optimal experiments for true quantitative microstructure features extracted from the reconstructed tractograms.

Although the disclosure has been shown and described with respect to certain preferred embodiments, equivalents and modifications will occur to others skilled in the art upon the reading and understanding of the specification. The present disclosure includes all such equivalents and modifications and is limited only by the scope of the appended claims.

The invention claimed is:

1. A computer-implemented method for determining one or more tractograms of a global tractography of a tissue of interest, the method comprising:
   obtaining at least one instance of diffusion magnetic resonance imaging (dMRI) data of the tissue of interest;
   obtaining, from a tractogram database storing predetermined tractograms associated with one or more tissue of interests, at least one predetermined tractogram associated with the at least one instance of the dMRI data; and
   generating, by a trained machine-learning (ML) algorithm, the one or more tractograms by inputting both the at least one instance of the dMRI data and the at least one predetermined tractogram into the trained machine-learning algorithm, wherein the trained ML algorithm comprises an encoder network and a generator network, the encoder network configured to input the at least one instance of the dMRI data and outputs a latent representation, the generator network configured to input the latent representation and output the one or more tractograms.

2. The computer-implemented method of claim 1, wherein obtaining of the at least one predetermined tractogram comprises:
   retrieving, from the tractogram database, one or more tractograms within a distance metric to a tractogram representing the at least one instance of the dMRI data, wherein the at least one predetermined tractogram is selected from the one or more of the tractograms within the distance metric.

3. The computer-implemented method of claim 2, wherein retrieving of the one or more of the tractograms within the distance metric comprises:
   extracting, from the at least one instance of the dMRI data, a feature map representing the at least one instance of the dMRI data;
   comparing the feature map representing the at least one instance of the dMRI data with each feature map representing each predetermined tractogram in the tractogram database.

4. The computer-implemented method of claim 3, wherein each predetermined tractogram in the tractogram database has multiple deformed versions and each of the multiple deformed versions has a feature map representing the respective deformed version of the corresponding predetermined tractogram.

5. The computer-implemented method of claim 1, wherein obtaining of the at least one predetermined tractogram comprises:
   applying a rule-based algorithm to the at least one instance of the dMRI data to obtain the at least one predetermined tractogram.

6. The computer-implemented method of claim 1, further comprising:
   concatenating the at least one instance of the dMRI data and the obtained at least one predetermined tractogram; and
   applying the trained ML algorithm to the concatenated data.

7. The computer-implemented method of claim 1, wherein the encoder network comprises a first encoder branch and a second encoder branch,
   the method further comprising:
   feeding the at least one instance of the dMRI data to the first encoder branch to generate a first feature representing the at least one instance of the dMRI data;

feeding the obtained at least one predetermined tractogram to the second encoder branch to generate a second feature representing the obtained at least one predetermined tractogram;

combining the first feature and the second feature to obtain a combination of both features; and feeding the combination to the generator network to generate the one or more tractograms.

8. The computer-implemented method of claim 7, wherein the first feature and the second feature are combined using a pooling layer.

9. The computer-implemented method of claim 1, further comprising generating, based on the at least one instance of the dMRI data, at least one of an apparent diffusion coefficient map, a fractional anisotropy map, and a track-density imaging map.

10. The computer-implemented method of claim 9, wherein the trained ML algorithm comprises a generator network and the generator network comprises multiple branches, wherein the multiple branches respectively generate the one or more tractograms, the apparent diffusion coefficient map, the fractional anisotropy map, and the track-density imaging map.

11. A system comprising:

at least one memory configured to store program code;

at least one processor configured to load the program code from the at least one memory and execute the program code to:

obtain at least one instance of diffusion magnetic resonance imaging (dMRI) data of tissue of interest;

obtain, from a tractogram database storing predetermined tractograms associated with one or more tissue of interests, at least one predetermined tractogram associated with the at least one instance of the dMRI data;

input the at least one instance of the dMRI data and the at least one predetermined tractogram into a trained machine-learning (ML) algorithm, wherein the trained ML algorithm comprises an encoder network and a generator network, the encoder network configured to input the at least one instance of the dMRI data and outputs a latent representation, the generator network configured to input the latent representation and output one or more tractograms; and generate, by the trained machine-learning algorithm, the one or more tractograms.

12. The system of claim 11, wherein the at least one processor is configured to retrieve, from the tractogram database, one or more tractograms within a distance metric to a tractogram representing the at least one instance of the dMRI data, wherein the at least one predetermined tractogram is selected from the one or more of the tractograms within the distance metric.

13. The system of claim 12, wherein the at least one processor is configured to extract, from the at least one instance of the dMRI data, a feature map representing the at least one instance of the dMRI data and compare the feature map representing the at least one instance of the dMRI data with each feature map representing each predetermined tractogram in the tractogram database, the retrieval being based on the comparison.

14. The system of claim 13, wherein each predetermined tractogram in the tractogram database has multiple deformed versions and each of the multiple deformed versions has a feature map representing the respective deformed version of the corresponding predetermined tractogram.

15. The system of claim 11, wherein the at least one processor is configured to apply a rule-based algorithm to the at least one instance of the dMRI data to obtain the at least one predetermined tractogram.

16. The system of claim 11, wherein the encoder network comprises a first encoder branch and a second encoder branch, wherein the at least one processor is configured to feed the at least one instance of the dMRI data to the first encoder branch to generate a first feature representing the at least one instance of the dMRI data, feed the obtained at least one predetermined tractogram to the second encoder branch to generate a second feature representing the obtained at least one predetermined tractogram, combine the first feature and the second feature to obtain a combination of both features, and feed the combination to the generator network to generate the one or more tractograms; wherein the generator network comprises multiple branches, the multiple branches configured to respectively generate the one or more tractograms, an apparent diffusion coefficient map, a fractional anisotropy map, and a track-density imaging map.

* * * * *